Nov. 5, 1957     C. B. McGEE     2,811,805
FISHING LINE FLOAT
Filed April 1, 1955
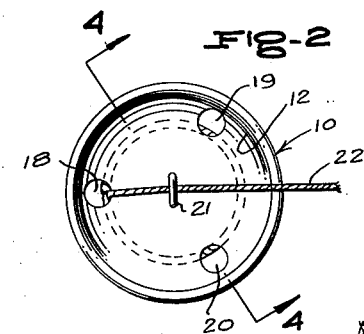
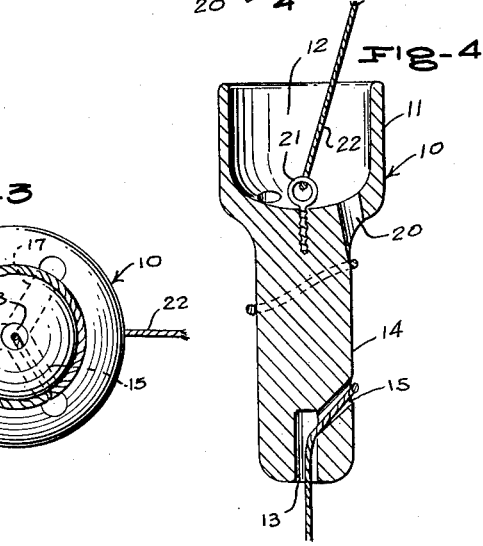
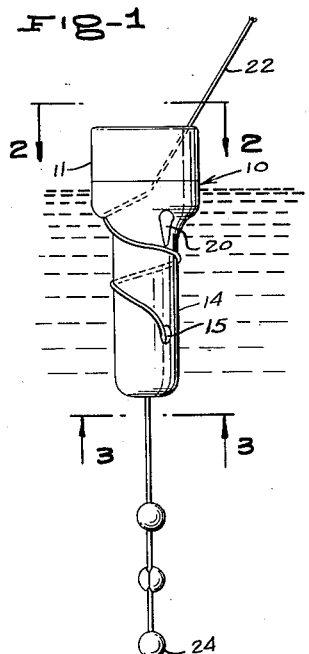
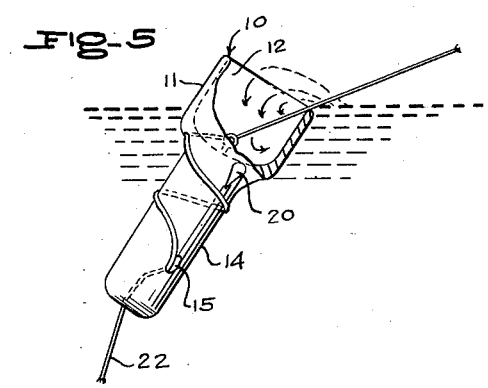
INVENTOR.
CURTIS B. McGEE
BY
McMorrow, Berman + Davidson
ATTORNEYS

United States Patent Office 2,811,805
Patented Nov. 5, 1957

2,811,805

FISHING LINE FLOAT

Curtis Blair McGee, Houston, Tex.

Application April 1, 1955, Serial No. 498,624

1 Claim. (Cl. 43—43.1)

The present invention relates to floats for supporting a fishing line in a body of water.

The primary object of the present invention is to provide a float for supporting a fishing line in a body of water and one which has means for producing a popping noise as it is pulled through the water, which is particularly attractive to fish.

Another object of the present invention is to provide a float for attaching to a fishing line and one which is instantly adjustable without knots or other securing means upwardly and downwardly upon the fishing line.

These and other objects and advantages of the present invention will be fully apparent from the following description when taken in conjunction with the annexed drawings, in which:

Figure 1 is a side view in elevation showing the fishing line float of the present invention in use with approximately three-fourths of its upper end projecting above the surface of a body of water, and showing the float supporting an end portion of a fishing line with attached sinkers and a hook;

Figure 2 is a top plan view taken on line 2—2 of Figure 1;

Figure 3 is a bottom view taken on line 3—3 of Figure 1;

Figure 4 is a side view in cross section taken on line 4—4 of Figure 2; and

Figure 5 is a side view in elevation showing the float tilted either by action of a fish or by pulling on the line, and indicating by arrows the flow of water into the open top of the float when the float is tilted to produce the popping noise which distinguishes the float of the present invention.

Referring in greater detail to the drawing in which like numerals indicate like parts throughout the several views, the present invention consists in a fishing line float comprising an upright body 10 having an enlarged upper portion 11 in which is provided a cup-like recess 12 opening upwardly and extending inwardly from the upper end of the body 10. A bore 13 extends upwardly from the lower end of the body 10 and terminates at a spaced distance from the bottom of the recess 12. Around the lower portion 14 of the body 10 are spaced apertures 15, 16, and 17, shown in dotted lines in Figure 3, each sloping downwardly and connected in communication with the bore 13.

Also extending upwardly at a slight angle to the vertical are other spaced apertures 18, 19, and 20, each of them extending inwardly from the exterior of the body 10 adjacent to the point of juncture of the lower portion 14 with the upper portion 11 and each being connected in communication with the recess 12 at the lower end of the latter.

A screw eye 21 is secured to the bottom of the recess 12 centrally thereof and a fishing line 22 is successively received through the open end of the recess 12, then through the screw eye 21, outwardly through the one aperture 18, inwardly through the aperture 15, and then outwardly and downwardly from the bore 13, with the section of the fishing line 22 between the apertures 15 and 18 wound at least a turn and a half around the body 10 intermediate of the apertures 15 and 18.

In use, the float is positioned at whatever height is desired above the hook 23 and sinkers 24 or other lure in use, and the float is instantly adjusted upwardly or downwardly on the line 22 by merely loosening the section of the line which is wound around and frictionally engages the lower end portion 14 of the body 10.

In Figure 5, the arrows indicate the direction of flow of water into the recess 12 when the float is tilted as by pulling on the line or when small waves flow over the open upper end of the body. This action of the water produces a distinctive popping sound similar to that made by the broaching of small fish or shrimp while they are pursued near the surface by trout or other larger fish.

The float of the present invention is preferably fabricated from a lightweight and buoyant material such as balsa wood or the like and may be painted in distinctive colors so that it is readily visible on the surface of the water.

What is claimed is:

For use with a fishing line, a float comprising an upright buoyant body having an enlarged upper end portion provided with a recess extending inwardly from the upper end of said body and with a lower end portion having a bore extending upwardly from the lower end of said body, said bore terminating at a point spaced from said recess, said body being provided with at least two apertures extending inwardly from the side of said body in the lower end portion thereof, each of said apertures being connected in communication with said bore, said body being provided with at least two other apertures extending inwardly from the side of said body in the upper end portion thereof, each of said second-named apertures being connected in communication with said recess, said recess, each of said first and second named apertures and said bore successively receiving therethrough a portion of a fishing line with the section of the line between said first and second apertures wound about and frictionally engaging the lower end portion of said body, and loop means secured to said body in and centrally of said recess successively receiving said fishing line portion adjacent to the point of emergence of said line portion from said one of said second-named apertures.

References Cited in the file of this patent

UNITED STATES PATENTS

| 261,505 | Wilson | July 18, 1882 |
| 441,447 | Stahl | Nov. 25, 1890 |
| 2,103,222 | Nelson | Dec. 21, 1937 |
| 2,262,974 | Steiner | Nov. 18, 1941 |
| 2,712,197 | Lewis | July 5, 1955 |
| 2,724,206 | Miller | Nov. 22, 1955 |